US011940083B2

(12) United States Patent
Alsaiari et al.

(10) Patent No.: US 11,940,083 B2
(45) Date of Patent: Mar. 26, 2024

(54) DETERMINING THERMAL CONDITIONS IN A PIPELINE

(71) Applicant: Saudi Arabian Oil Company, Dhahran (SA)

(72) Inventors: Hamad Alsaiari, Al-Khobar (SA); Ali Alshehri, Thuwal (SA); Ayman Amer, Thuwal (SA); Ali Meshaikhis, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 471 days.

(21) Appl. No.: 17/348,494

(22) Filed: Jun. 15, 2021

(65) Prior Publication Data

US 2022/0397227 A1    Dec. 15, 2022

(51) Int. Cl.
| | |
|---|---|
| *F16L 59/14* | (2006.01) |
| *F16L 53/30* | (2018.01) |
| *G01N 17/00* | (2006.01) |
| *G01N 25/56* | (2006.01) |
| *G01M 99/00* | (2011.01) |

(52) U.S. Cl.
CPC .............. *F16L 59/14* (2013.01); *F16L 53/30* (2018.01); *G01N 17/006* (2013.01); *G01N 25/56* (2013.01); *G01M 99/002* (2013.01)

(58) Field of Classification Search
CPC ........... F16L 59/14; F16L 59/30; F16L 53/30; G01N 17/006; G01N 25/56; G01M 99/002
USPC ....................................................... 165/222
See application file for complete search history.

(56) References Cited

U.S. PATENT DOCUMENTS

| | | | |
|---|---|---|---|
| 4,872,762 A | 10/1989 | Koshihara et al. | |
| 9,255,875 B2 | 2/2016 | Denenberg et al. | |
| 9,518,918 B2 | 12/2016 | Mann et al. | |
| 10,100,966 B2 | 10/2018 | Vermont et al. | |

(Continued)

FOREIGN PATENT DOCUMENTS

| | | |
|---|---|---|
| CN | 104197146 | 12/2014 |
| JP | 2008134221 | 6/2008 |

(Continued)

OTHER PUBLICATIONS

Vahdati et al., "External corrosion detection of oil pipelines using fiber optics." Sensors 20.3, 684, Jan. 2020, 16 pages.

(Continued)

*Primary Examiner* — Joel M Attey
(74) *Attorney, Agent, or Firm* — Fish & Richardson P.C.

(57) ABSTRACT

Techniques for determining a thermal condition of a pipeline include identifying a pipeline that carries a fluid at a steady-state temperature, where the pipeline includes a tubular conduit that includes a bore that carries the fluid, and a layer of insulation installed over an exterior surface of the tubular conduit; changing the steady-state temperature of the fluid by applying a thermal contrast to the pipeline; based on changing the steady-state temperature, detecting a thermal gradient between the fluid carried in the bore and at least one of the tubular conduit or the layer of insulation at a particular location of the pipeline; and based on the detected thermal gradient, determining a presence of at least one of water or water vapor between the exterior surface of the tubular conduit and the layer of insulation at the particular location of the pipeline.

28 Claims, 9 Drawing Sheets

(56) References Cited

U.S. PATENT DOCUMENTS

| | | | |
|---|---|---|---|
| 10,643,324 B2 | 5/2020 | Al Shehri et al. | |
| 10,768,094 B2 | 9/2020 | Amer et al. | |
| 10,908,069 B2 | 2/2021 | Amer et al. | |
| 2010/0107767 A1* | 5/2010 | Kane | G01N 25/72 73/592 |
| 2012/0265450 A1 | 10/2012 | Suetsugu et al. | |
| 2016/0245452 A1 | 8/2016 | Kim et al. | |
| 2018/0335404 A1* | 11/2018 | Amer | B64C 39/024 |
| 2021/0018426 A1 | 1/2021 | Amer et al. | |
| 2022/0397241 A1 | 12/2022 | Al Saiari et al. | |

FOREIGN PATENT DOCUMENTS

| | | |
|---|---|---|
| JP | 2008157806 | 7/2008 |
| WO | WO 9114898 | 10/1991 |
| WO | 2020047469 | 3/2020 |

OTHER PUBLICATIONS

SAIP Examination Report in SAIP Appln No. 122431229, dated Jun. 19, 2023, 23 pages, with English Translation.

* cited by examiner

DETERMINING THERMAL CONDITIONS IN A PIPELINE

TECHNICAL FIELD

The present disclosure describes apparatus, systems, and methods for determining thermal conditions in a pipeline and, more particularly, determining thermal conditions in a pipeline that carries a fluid, such as a hydrocarbon fluid.

BACKGROUND

Corrosion under insulation (CUI) is a condition in which an insulated structure such as a metal pipe suffers corrosion on the metal surface. When CUI is undetected, the results of can lead to the shutdown of a process unit or an entire facility and can lead to catastrophic incidents. Since it is a hidden corrosion mechanism, the damage remains unnoticed until the metal pipe is exposed or advanced non-destructive testing (NDT) techniques, such as infrared thermography, are used to ascertain the metal condition beneath the insulation. Exposure of the metal pipe can be a time-consuming and costly process, while the accuracy of NDT techniques can be insufficient due to the large number of variables (for example, geometrical, environmental, material-related), that cause false positives (incorrect detection of corrosion) and false negatives (incorrect non-detection of corrosion) in the detection process. Additionally, many facilities have elevated networks of pipes that are difficult to access, requiring scaffolding for visual inspection.

SUMMARY

In an example implementation, a method for determining a thermal condition of a pipeline, including identifying a pipeline that carries a fluid at a steady-state temperature. The pipeline includes a tubular conduit that includes a bore that carries the fluid, and a layer of insulation installed over an exterior surface of the tubular conduit. The method further includes changing the steady-state temperature of the fluid by applying a thermal contrast to the pipeline; based on changing the steady-state temperature, detecting a thermal gradient between the fluid carried in the bore and at least one of the tubular conduit or the layer of insulation at a particular location of the pipeline; and based on the detected thermal gradient, determining a presence of at least one of water or water vapor between the exterior surface of the tubular conduit and the layer of insulation at the particular location of the pipeline.

In an aspect combinable with the example implementation, the fluid includes a first fluid, and changing the steady-state temperature by applying the thermal contrast to the pipeline includes circulating a second fluid from a bypass conduit through an outlet of the bypass conduit that is positioned in the layer of insulation, the second fluid at a temperature different than the steady-state temperature; and changing the steady-state temperature through heat transfer between the first fluid and the second fluid.

In another aspect combinable with any of the previous aspects, the first fluid includes a hydrocarbon fluid and the second fluid includes a non-hydrocarbon gas.

In another aspect combinable with any of the previous aspects, circulating the second fluid from the bypass conduit through the outlet of the bypass conduit that is positioned in the layer of insulation includes circulating the second fluid from the bypass conduit through the outlet of the bypass conduit that is positioned in the layer of insulation at a time instant of one of sunrise or sunset.

In another aspect combinable with any of the previous aspects, detecting the thermal gradient between the first fluid and at least one of the tubular conduit or the layer of insulation at the particular location of the pipeline includes detecting the thermal gradient between the first fluid and at least one of the tubular conduit or the layer of insulation at the particular location of the pipeline subsequent to the circulating at the time instant.

In another aspect combinable with any of the previous aspects, circulating the second fluid from the bypass conduit through the outlet of the bypass conduit that is positioned in the layer of insulation includes circulating the second fluid from the bypass conduit through the outlet of the bypass conduit that is positioned in the layer of insulation at a time instant of a shutdown or a startup.

In another aspect combinable with any of the previous aspects, detecting the thermal gradient between the first fluid and at least one of the tubular conduit or the layer of insulation at the particular location of the pipeline includes detecting the thermal gradient between the first fluid and at least one of the tubular conduit or the layer of insulation at the particular location of the pipeline subsequent to the circulating at the time instant.

In another aspect combinable with any of the previous aspects, circulating the second fluid from the bypass conduit through an outlet of the bypass conduit that is positioned in the layer of insulation includes forcibly circulating the second fluid with at least one pump or at least one fan positioned in fluid communication with the bypass conduit.

In another aspect combinable with any of the previous aspects, changing the steady-state temperature by applying the thermal contrast to the pipeline includes heating an exterior surface of the pipeline to a temperature higher than the steady-state temperature; and changing the steady-state temperature through heat transfer from the exterior surface of the pipeline to the fluid in the bore.

In another aspect combinable with any of the previous aspects, the fluid includes a first fluid, and changing the steady-state temperature by applying the thermal contrast to the pipeline includes circulating a second fluid from a bypass conduit that includes an outlet positioned in the layer of insulation, the second fluid at a temperature different than the steady-state temperature; heating an exterior surface of the pipeline to a temperature higher than the steady-state temperature; and changing the steady-state temperature through heat transfer between the first fluid and the second fluid and heat transfer between the exterior surface of the pipeline and the first fluid.

In another aspect combinable with any of the previous aspects, the pipeline further includes a cladding installed over an exterior surface of the layer of insulation, the method further including detecting the thermal gradient between the fluid carried in the bore and at least one of the tubular conduit, the layer of insulation, or the cladding at the particular location of the pipeline.

In another aspect combinable with any of the previous aspects, detecting the thermal gradient includes generating a graphical representation of the thermal gradient with an infrared (IR) camera.

In another aspect combinable with any of the previous aspects, the tubular conduit includes a metallic tubular conduit.

Another aspect combinable with any of the previous aspects further includes, based on the presence of at least one of water or water vapor between the exterior surface of the tubular conduit and the layer of insulation at the particular location of the pipeline, determining a location of potential corrosion under insulation (CUI) in the metallic tubular conduit at the particular location of the pipeline.

In another aspect combinable with any of the previous aspects, the steady-state temperature is between −4° C. and 175° C.; or 120° C. and 350° C.

Another aspect combinable with any of the previous aspects further includes identifying, with a control system communicably coupled to a thermal image detector, at least one thermograph of the thermal gradient from the thermal image detector; correlating, with a machine learning model executed by the control system, the at least one thermograph with a classification of a corrosion under insulation (CUI) at the particular location; and generating an output of the classification of the CUI at the particular location for display on a graphical user interface (GUI).

In another aspect combinable with any of the previous aspects, the machine-learning model includes a trained machine-learning model based on a plurality of thermographs correlated with user identified classifications of CUI.

In another example implementation, a system includes a pipeline that carries a first fluid at a steady-state temperature, the pipeline including a tubular conduit that includes a bore that carries the first fluid, and a layer of insulation installed over an exterior surface of the tubular conduit; a second fluid configured to circulate to one of the layer of insulation or an exterior surface of the pipeline at a temperature sufficient to change the steady-state temperature of the first fluid; and a thermal image detector configured to detect a thermal gradient between the first fluid carried in the bore and at least one of the tubular conduit or the layer of insulation at a particular location of the pipeline to indicate a presence of at least one of water or water vapor between the exterior surface of the tubular conduit and the layer of insulation at the particular location of the pipeline.

An aspect combinable with the example implementation further includes a bypass conduit that includes an outlet positioned in the layer of insulation and configured to carry the second fluid into the layer of insulation to change the steady-state temperature through heat transfer between the first fluid and the second fluid.

In another aspect combinable with any of the previous aspects, the first fluid includes a hydrocarbon fluid and the second fluid includes a non-hydrocarbon gas.

Another aspect combinable with any of the previous aspects further includes at least one pump or at least one fan positioned in fluid communication with the bypass conduit and configured to forcibly circulate the second fluid into the bypass conduit, through the outlet, and into the layer of insulation.

Another aspect combinable with any of the previous aspects further includes a heating device configured to supply the second fluid to the exterior surface of the pipeline to change the steady-state temperature through heat transfer between the first fluid and the second fluid through the exterior surface of the pipeline.

Another aspect combinable with any of the previous aspects further includes at least one pump or at least one fan positioned in fluid communication with the bypass conduit and configured to forcibly circulate the second fluid into the bypass conduit, through the outlet, and into the layer of insulation; and a heating device configured to supply the second fluid to the exterior surface of the pipeline to change the steady-state temperature through heat transfer between the first fluid and the second fluid through the exterior surface of the pipeline.

In another aspect combinable with any of the previous aspects, the pipeline further includes a cladding installed over an exterior surface of the layer of insulation.

In another aspect combinable with any of the previous aspects, the thermal image detector is configured to detect a thermal gradient between the first fluid carried in the bore and at least one of the tubular conduit, the layer of insulation, or the cladding at the particular location of the pipeline.

In another aspect combinable with any of the previous aspects, the thermal image detector includes an infrared (IR) camera configured to generate a graphical representation of the thermal gradient.

In another aspect combinable with any of the previous aspects, the tubular conduit includes a metallic tubular conduit.

In another aspect combinable with any of the previous aspects, the presence of at least one of water or water vapor between the exterior surface of the tubular conduit and the layer of insulation at the particular location of the pipeline indicates a location of potential corrosion under insulation (CUI) in the metallic tubular conduit at the particular location of the pipeline.

In another aspect combinable with any of the previous aspects, the steady-state temperature is between −4° C. and 175° C.; or 120° C. and 350° C.

Another aspect combinable with any of the previous aspects further includes a control system communicably coupled to the thermal image detector and configured to perform operations including identifying at least one thermograph of the thermal gradient from the thermal image detector; correlating, with a machine learning model executed by the control system, the at least one thermograph with a classification of a corrosion under insulation (CUI) at the particular location; and generating an output of the classification of the CUI at the particular location for display on a graphical user interface (GUI).

In another aspect combinable with any of the previous aspects, the machine-learning model includes a trained machine-learning model based on a plurality of thermographs correlated with user identified classifications of CUI.

Implementations of systems and methods for detecting CUI in a pipeline according to the present disclosure may include one or more of the following features. For example, implementations according to the present disclosure can minimize data acquisition time for detecting CUI. As another example, implementations according to the present disclosure can enhance inspection speed of a pipeline for CUI. Further, implementations according to the present disclosure can allow inspectors to avoid specific inspection times during a day to provide inspection time flexibility.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
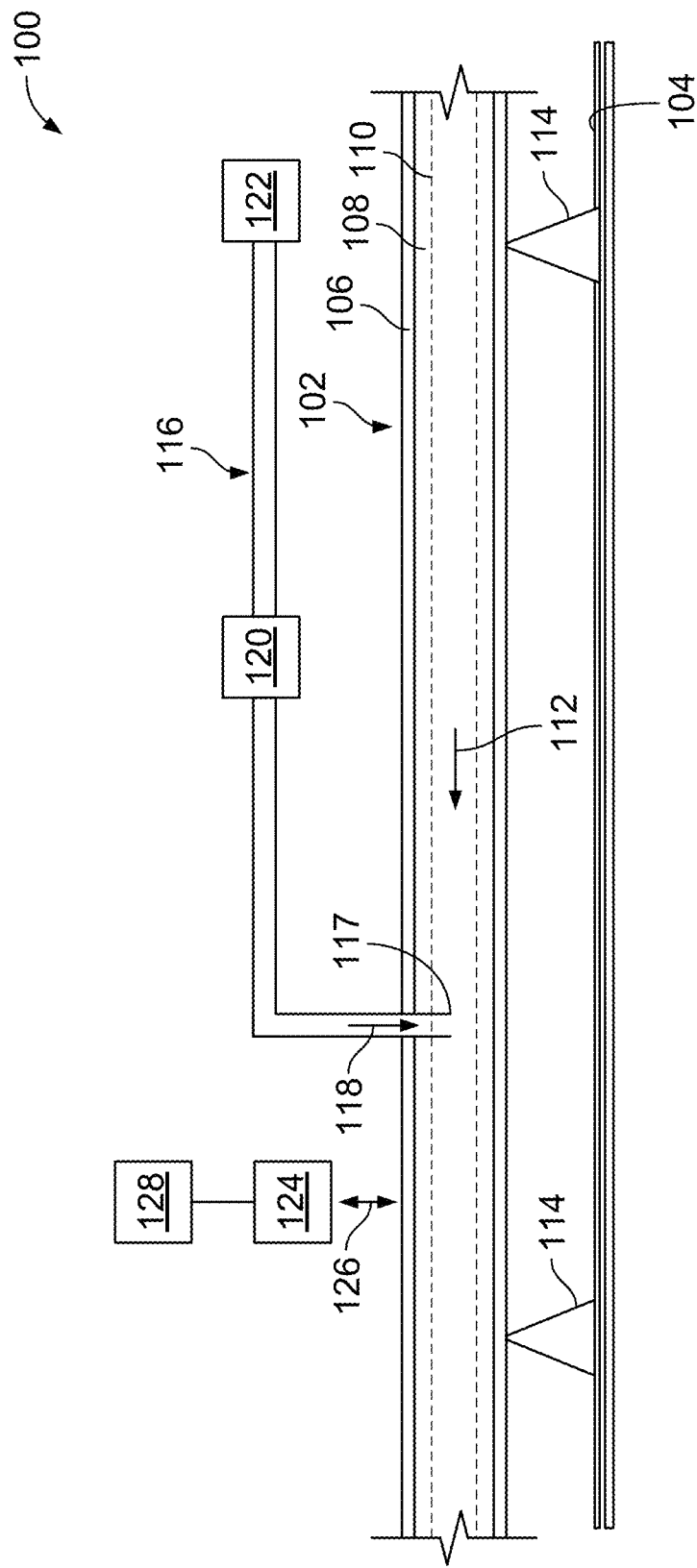
FIG. 1 is a schematic diagram of an example implementation of a system for determining thermal conditions in a pipeline according to the present disclosure.

FIG. 1 shows an example pipeline system 100 that includes a pipeline 102 for which one or more thermal conditions can be determined, for example, to determine a location or CUI or a location of potential CUI of the pipeline 102. In this example, the pipeline 102 carries a fluid 112 there through (for example, through forced or natural circulation). The pipeline, as shown in this example implementation, is an above-ground pipeline that is positioned above a terranean surface 104 on one or more supports 114. In alternative examples, the pipeline 102 can be supported above the terranean surface 104 by hangers or other structure such that most or all of the pipeline 102 is not in direct or indirect contact with the terranean surface 104.

In this example, the fluid 112 can be a liquid, a gas, or a mixed-phase fluid. The fluid 112 can be, in this example implementation, a hydrocarbon fluid, such as Natural Gas Liquid (NGL) or Liquid Petroleum Gas (LPG). The fluid 112 can be circulated through the pipeline 102 at a variety of flow rates (depending on the application) and at a variety of temperatures (depending on the fluid composition). In some aspects, the fluid 112 is at a temperature range of 25-350° F. (−4-175° C.), 120-350° F. (50-175° C.), or other temperature range.

As shown in this example implementation, the pipeline 102 is comprised of a conduit 110 (for example, a metal conduit such as steel or other metal) that is enclosed or encases (all or mostly) by a layer of insulation 108. A cladding 106 (for example, a metal cladding such as galvanized steel or aluminum). In the example pipeline 102, corrosion of the conduit 110 can occur when moisture (such as water) infiltrates an annulus space between the conduit 110 and the insulation 108. Once moisture infiltrates this annular space, corrosion (for example, CUI) can occur. As the corrosion cannot be easily observed due to the insulation 108 that covers the conduit 110, CUI is challenging to detect. Sources of moisture that can induce corrosion include rain, water leaks, and condensation, cooling water tower drift, deluge systems and steam tracing leaks. While corrosion usually begins locally at a particular location of the conduit 110, it can progress at high rates especially if there are repetitive thermal heating and/or cooling cycles or contaminants in the water medium or surrounding air such as chloride or acid.

The pipeline system 100 also includes a bypass conduit 116 that includes an outlet 117 that is positioned within the conduit 110, such that a portion of the bypass conduit 116 passes through the cladding 106 and the insulation 108 of the pipeline 102. The bypass conduit 116 carries a secondary fluid 118 through the bypass conduit 116 and into the conduit 110 of the pipeline 102 (for example, to mix with the fluid 112). The secondary fluid 118, in this example implementation, can be the same or similar composition as the fluid 112. In the present disclosure, a similar composition can mean that mixing of the secondary fluid 118 into the fluid 112 does not significantly alter the composition of the fluid 112. The secondary fluid 118 can also be the same phase as the fluid 112. For instance, if the fluid 112 is liquid, the secondary fluid 118 can also be liquid; if the fluid 112 is gas, the secondary fluid 118 can also be gas.

At least one pump 120 (in the case of the secondary fluid 118 being liquid) of fan 120 (in the case of the secondary fluid 118 being gas) is positioned in the bypass conduit 116 to circulate the secondary fluid 118 into the conduit 110 from a source 122 of the secondary fluid 118. In this example implementation, the secondary fluid 118 is at a different temperature than the fluid 112. For example, the secondary fluid 118 can be 0.4° C. lower or greater than a temperature of the fluid 112. In some examples, the secondary fluid 118 can be more than 0.4° C. lower or greater than the temperature of the fluid 112. In other examples, the secondary fluid 118 can be less than 0.4° C. lower or greater than the temperature of the fluid 112. In any event, the secondary fluid 118 can be introduced into the fluid 112 at a temperature sufficient to cause a change in temperature to at least a portion of the fluid 112 circulating through the conduit 110.

Figure 8:
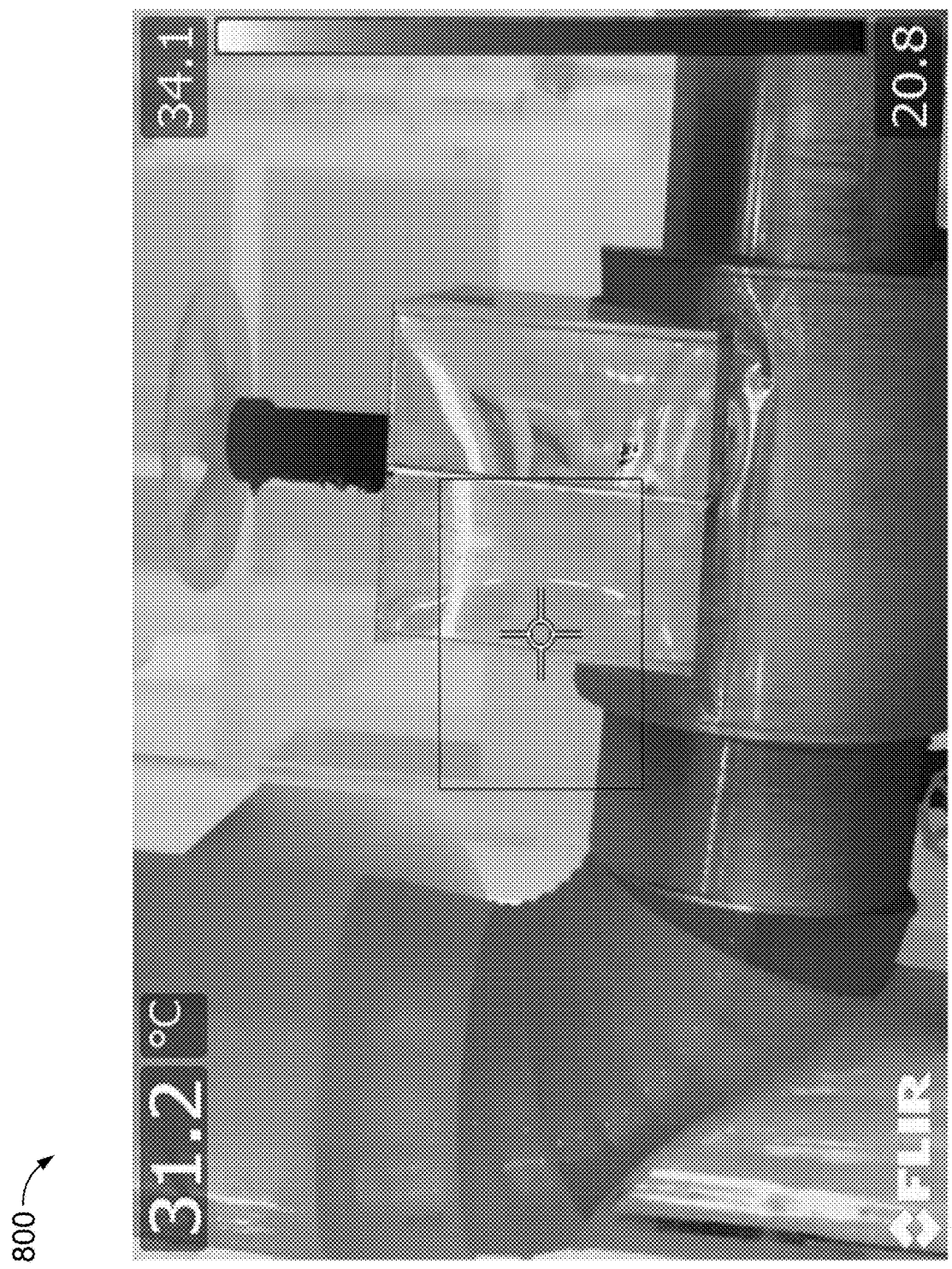
FIG. 8 shows an example thermograph image according to the present disclosure.

As shown in this example implementation, a thermal image detector 124 is positioned near or close to the pipeline 102 (and can be moved along a length of the pipeline 102 to capture one or more thermal images 126 of an exterior surface of the pipeline 102 (for example, with the cladding 106 and the insulation 108 remaining intact over the conduit 110). The captured thermal images 126 can show, for example, thermal gradients between the components of the pipeline 102, including, for example, between the fluid 112 (with the temperature adjusted by the secondary fluid 118) and the conduit 110, between the fluid 112 (with the temperature adjusted by the secondary fluid 118) and any moisture (such as water) between an exterior surface of the conduit 110 and the insulation 108, as well as between other components of the pipeline 102. In some examples, the thermal image detector 124 can be an infrared (IR) camera or other device operable to capture thermographic images of the pipeline 102. For example, FIG. 8 shows an example thermographic image (in greyscale) 800 of a portion of a pipeline, such as pipeline 102.

A control system 128 (such as a microprocessor based control system) is communicably coupled (wired or wirelessly) to the thermal image detector 124. In an example operation, subsequent to or during circulation of the secondary fluid 118 into the fluid 112 to change the temperature of the fluid 112, the thermal image detector 124 can capture thermal images of one or more portions of the pipeline 102 (as controlled by the control system 128 or otherwise). The captured thermal images 126 can be transmitted to or otherwise available to the control system 128 for analysis and a determination of whether there is moisture under the insulation 108 (and therefore CUI or potential CUI) at any of the one or more portions of the pipeline 102. For example, the control system 128 can generate one or more heat maps over a length of the pipeline 102 based on the captured thermal images 126. The heat maps can show thermal gradients consistent with moisture between the conduit 110 and the insulation 108, as such moisture, likely being water, has a higher heat capacity as compared to the conduit 110. Based on the detection of moisture by the one or more heat maps, the control system 128 can determine a potential for CUI at the particular locations of the moisture.

Figure 2:
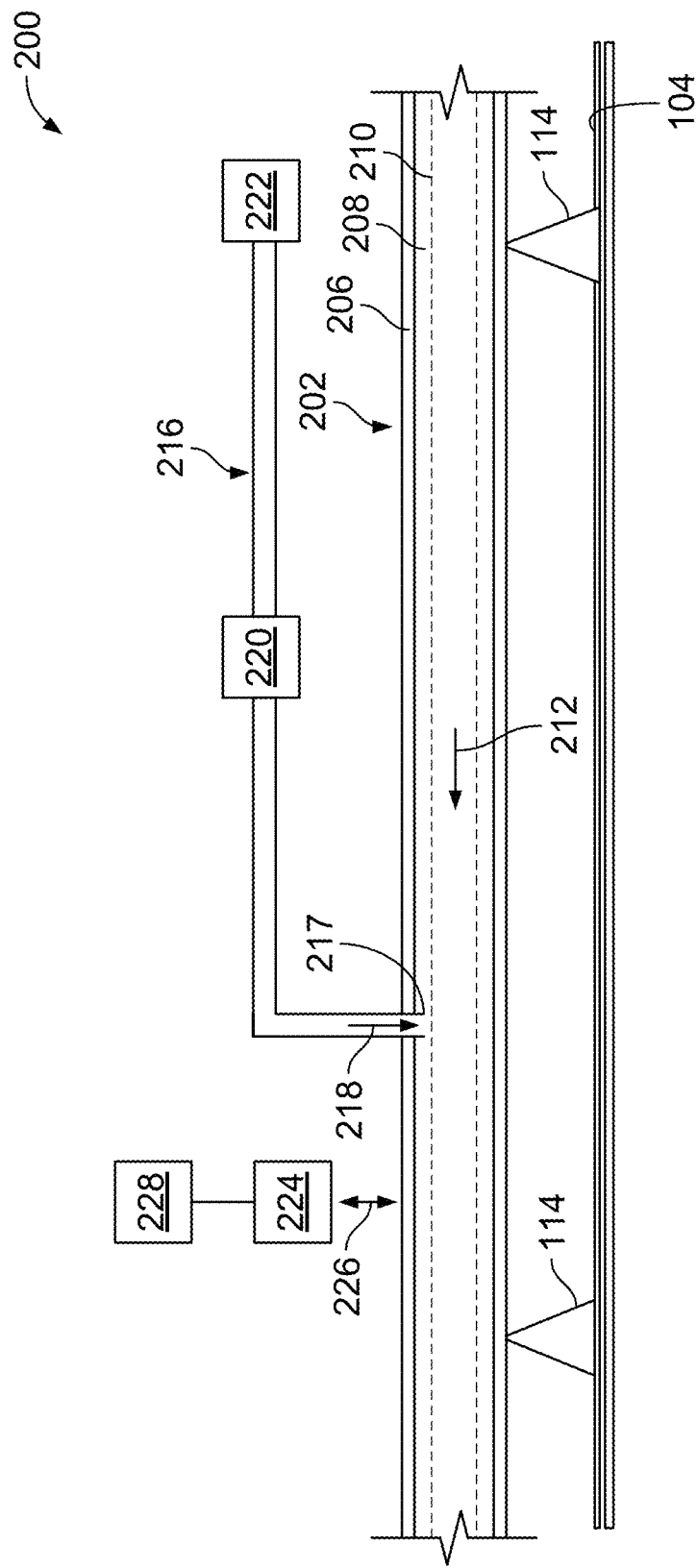
FIG. 2 is a schematic diagram of another example implementation of a system for determining thermal conditions in a pipeline according to the present disclosure.

FIG. 2 shows another example pipeline system 200 that includes a pipeline 202 for which one or more thermal conditions can be determined, for example, to determine a location or CUI or a location of potential CUI of the pipeline 202. In this example, the pipeline 202 carries a fluid 212 there through (for example, through forced or natural circulation). The pipeline, as shown in this example implementation, is an above-ground pipeline that is positioned above the terranean surface 104 on one or more supports 114. In alternative examples, the pipeline 202 can be supported above the terranean surface 104 by hangers or other structure such that most or all of the pipeline 202 is not in direct or indirect contact with the terranean surface 104.

In this example, the fluid 212 can be a liquid, a gas, or a mixed-phase fluid. The fluid 212 can be, in this example implementation, a hydrocarbon fluid, such as Natural Gas Liquid (NGL) or Liquid Petroleum Gas (LPG). The fluid 212 can be circulated through the pipeline 202 at a variety of flow rates (depending on the application) and at a variety of temperatures (depending on the fluid composition). In some aspects, the fluid 212 is at a temperature range of 25-350° F. (−4-175° C.), 120-350° F. (50-175° C.), or other temperature range.

As shown in this example implementation, the pipeline 202 is comprised of a conduit 210 (for example, a metal conduit such as steel or other metal) that is enclosed or encases (all or mostly) by a layer of insulation 208. A cladding 206 (for example, a metal cladding such as galvanized steel or aluminum). In the example pipeline 202, corrosion of the conduit 210 can occur when moisture (such as water) infiltrates an annulus space between the conduit 210 and the insulation 208. Once moisture infiltrates this annular space, corrosion (for example, CUI) can occur. As the corrosion cannot be easily observed due to the insulation 208 that covers the conduit 210, CUI is challenging to detect. Sources of moisture that can induce corrosion include rain, water leaks, and condensation, cooling water tower drift, deluge systems and steam tracing leaks. While corrosion usually begins locally at a particular location of the conduit 210, it can progress at high rates especially if there are repetitive thermal heating and/or cooling cycles or contaminants in the water medium or surrounding air such as chloride or acid.

The pipeline system 200 also includes a bypass conduit 216 that includes an outlet 217 that is positioned within the layer of insulation 208, such that a portion of the bypass conduit 216 passes through the cladding 206 of the pipeline 202. The bypass conduit 216 carries a secondary fluid 218 through the bypass conduit 216 and into the insulation 208 of the pipeline 202 (for example, to circulate within the insulation 208); thus in this system 200, the secondary fluid 218 and the fluid 212 are not mixed or fluidly coupled. The secondary fluid 218, in this example implementation, can be the same or different composition as the fluid 212. In some aspects, the secondary fluid 218 can be an inert gas (or other non-sour and non-toxic gas). In other aspects, the secondary fluid 218 can be a hydrocarbon gas.

At least one fan 220 is positioned in the bypass conduit 216 to circulate the secondary fluid 218 into the insulation 208 from a source 222 of the secondary fluid 218. In this example implementation, the secondary fluid 218 is at a different temperature than the fluid 212. For example, the secondary fluid 218 can be 0.4° C. lower or greater than a temperature of the fluid 212. In some examples, the secondary fluid 218 can be more than 0.4° C. lower or greater than the temperature of the fluid 212. In other examples, the secondary fluid 218 can be less than 0.4° C. lower or greater than the temperature of the fluid 212. In any event, the secondary fluid 218 can be introduced into the fluid 212 at a temperature sufficient to cause a change in temperature to at least a portion of the fluid 212 circulating through the conduit 210.

As shown in this example implementation, a thermal image detector 224 is positioned near or close to the pipeline 202 (and can be moved along a length of the pipeline 202 to capture one or more thermal images 226 of an exterior surface of the pipeline 202 (for example, with the cladding 206 and the insulation 208 remaining intact over the conduit 210). The captured thermal images 226 can show, for example, thermal gradients between the components of the pipeline 202, including, for example, between the fluid 212 (with the temperature adjusted by the secondary fluid 218) and the conduit 210, between the fluid 212 (with the temperature adjusted by the secondary fluid 218) and any moisture (such as water) between an exterior surface of the conduit 210 and the insulation 208, between the secondary fluid 218 (within the insulation 208) and the conduit 210, between the secondary fluid 212 (within the insulation 208) and any moisture (such as water) between an exterior surface of the conduit 210 and the insulation 208, as well as between other components of the pipeline 202. In some examples, the thermal image detector 224 can be an infrared (IR) camera or other device operable to capture thermographic images of the pipeline 202.

A control system 228 (such as a microprocessor based control system) is communicably coupled (wired or wirelessly) to the thermal image detector 224. In an example operation, subsequent to or during circulation of the secondary fluid 218 into the insulation 208, the thermal image detector 224 can capture thermal images of one or more portions of the pipeline 202 (as controlled by the control system 228 or otherwise). The captured thermal images 226 can be transmitted to or otherwise available to the control system 228 for analysis and a determination of whether there is moisture under the insulation 208 (and therefore CUI or potential CUI) at any of the one or more portions of the pipeline 202. For example, the control system 228 can generate one or more heat maps over a length of the pipeline 202 based on the captured thermal images 226. The heat maps can show thermal gradients consistent with moisture between the conduit 210 and the insulation 208, as such moisture, likely being water, has a higher heat capacity as compared to the conduit 210. Based on the detection of moisture by the one or more heat maps, the control system 228 can determine a potential for CUI at the particular locations of the moisture.

Figure 3:
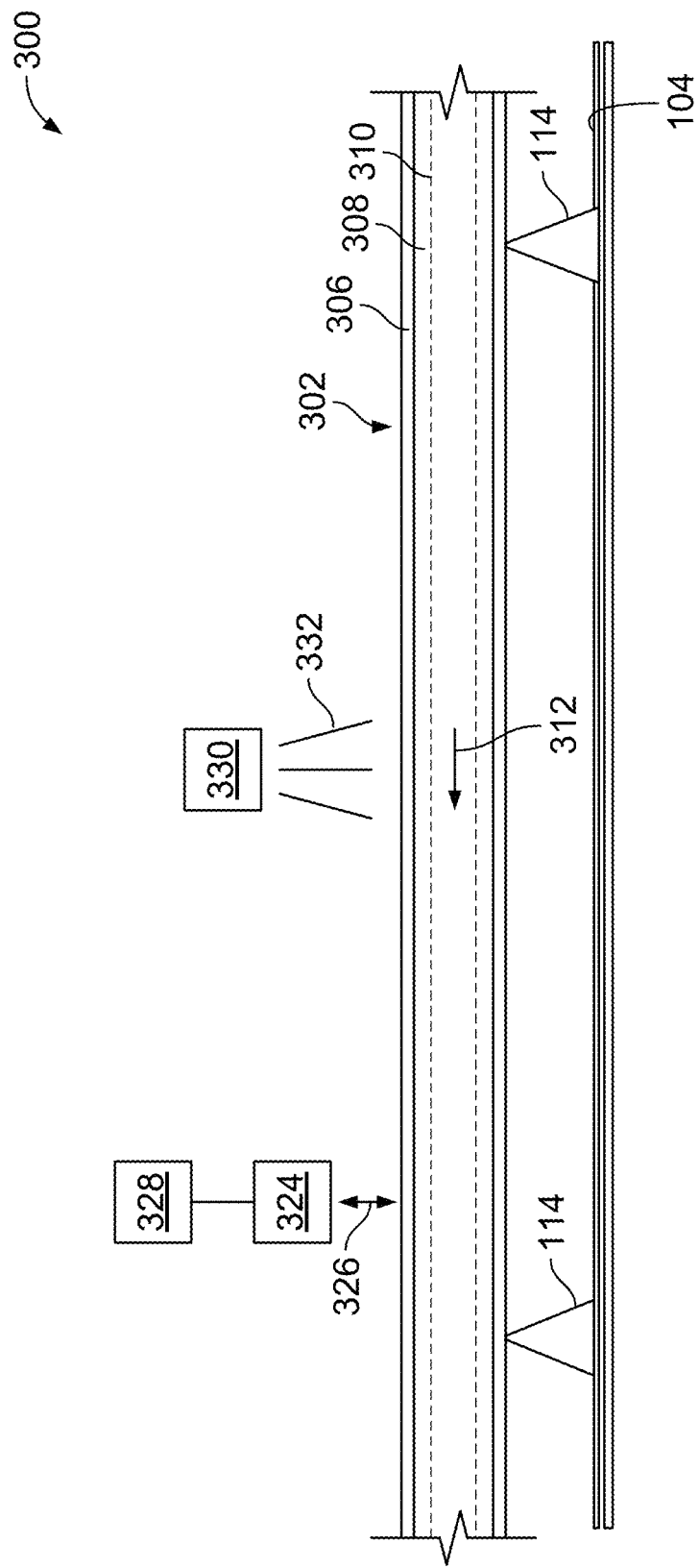
FIG. 3 is a schematic diagram of another example implementation of a system for determining thermal conditions in a pipeline according to the present disclosure.

FIG. 3 shows another example pipeline system 300 that includes a pipeline 302 for which one or more thermal conditions can be determined, for example, to determine a location or CUI or a location of potential CUI of the pipeline 302. In this example, the pipeline 302 carries a fluid 312 there through (for example, through forced or natural circulation). The pipeline, as shown in this example implementation, is an above-ground pipeline that is positioned above the terranean surface 104 on one or more supports 114. In alternative examples, the pipeline 302 can be supported above the terranean surface 104 by hangers or other structure such that most or all of the pipeline 302 is not in direct or indirect contact with the terranean surface 104.

In this example, the fluid 312 can be a liquid, a gas, or a mixed-phase fluid. The fluid 312 can be, in this example implementation, a hydrocarbon fluid, such as Natural Gas Liquid (NGL) or Liquid Petroleum Gas (LPG). The fluid 312 can be circulated through the pipeline 302 at a variety of flow rates (depending on the application) and at a variety of temperatures (depending on the fluid composition). In some aspects, the fluid 312 is at a temperature range of 25-350° F. (−4-175° C.), 120-350° F. (50-175° C.), or other temperature range. The fluid 312, in this example, can be at a steady-state temperature, e.g., a substantially constant temperature that changes insignificantly over a significant length of the pipeline 302.

As shown in this example implementation, the pipeline 302 is comprised of a conduit 310 (for example, a metal conduit such as steel or other metal) that is enclosed or encases (all or mostly) by a layer of insulation 308. A cladding 306 (for example, a metal cladding such as galvanized steel or aluminum). In the example pipeline 302, corrosion of the conduit 310 can occur when moisture (such as water) infiltrates an annulus space between the conduit 310 and the insulation 308. Once moisture infiltrates this annular space, corrosion (for example, CUI) can occur. As the corrosion cannot be easily observed due to the insulation 308 that covers the conduit 310, CUI is challenging to detect. Sources of moisture that can induce corrosion include rain, water leaks, and condensation, cooling water tower drift, deluge systems and steam tracing leaks. While corrosion usually begins locally at a particular location of the conduit 310, it can progress at high rates especially if there are repetitive thermal heating and/or cooling cycles or contaminants in the water medium or surrounding air such as chloride or acid.

The pipeline system 300 in this example implementation, includes a heating device 330 positioned at or near an exterior surface of the pipeline 302. The heating device 330, such as a hot air gun that uses resistance heating, can be operated to provide a heated fluid 332 (such as a heated airflow) against the exterior surface of the pipeline 302 in order to adjust (for example, raise) a temperature of at least a portion of the pipeline 302, including, in some examples, the fluid 312. The heating device 330, alternatively, can be a microwave heating device that heats the exterior surface of the pipeline 302 through microwaves. Alternatively, the heating device 330 can be a cooling device that operates to adjust (for example, lower) a temperature of at least a portion of the pipeline 302, including, in some examples, the fluid 312.

As shown in this example implementation, a thermal image detector 324 is positioned near or close to the pipeline 302 (and can be moved along a length of the pipeline 302 to capture one or more thermal images 326 of an exterior surface of the pipeline 302 (for example, with the cladding 306 and the insulation 308 remaining intact over the conduit 310). The captured thermal images 326 can show, for example, thermal gradients between the components of the pipeline 302, including, for example, between the fluid 312 (with the temperature adjusted by the secondary fluid 318) and the conduit 310, between the fluid 312 (with the temperature adjusted by the secondary fluid 318) and any moisture (such as water) between an exterior surface of the conduit 310 and the insulation 308, as well as between other components of the pipeline 302. In some examples, the thermal image detector 324 can be an infrared (IR) camera or other device operable to capture thermographic images of the pipeline 302.

A control system 328 (such as a microprocessor based control system) is communicably coupled (wired or wirelessly) to the thermal image detector 324. In an example operation, subsequent to or during operation of the heating device 330, the thermal image detector 324 can capture thermal images of one or more portions of the pipeline 302 (as controlled by the control system 328 or otherwise). The captured thermal images 326 can be transmitted to or otherwise available to the control system 328 for analysis and a determination of whether there is moisture under the insulation 308 (and therefore CUI or potential CUI) at any of the one or more portions of the pipeline 302. For example, the control system 328 can generate one or more heat maps over a length of the pipeline 302 based on the captured thermal images 326. The heat maps can show thermal gradients consistent with moisture between the conduit 310 and the insulation 308, as such moisture, likely being water, has a higher heat capacity as compared to the conduit 310. Based on the detection of moisture by the one or more heat maps, the control system 328 can determine a potential for CUI at the particular locations of the moisture.

Figure 4:
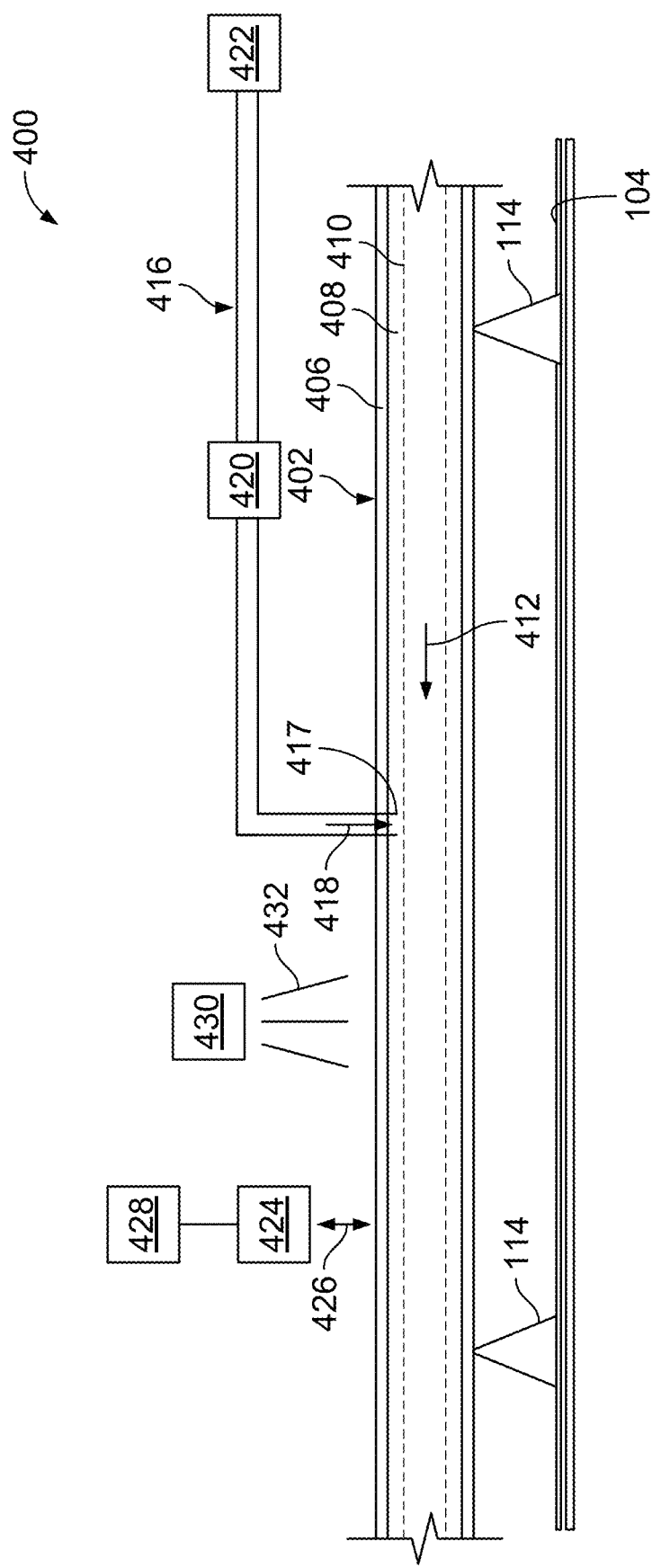
FIG. 4 is a schematic diagram of another example implementation of a system for determining thermal conditions in a pipeline according to the present disclosure.

FIG. 4 shows another example pipeline system 400 that includes a pipeline 402 for which one or more thermal conditions can be determined, for example, to determine a location or CUI or a location of potential CUI of the pipeline 402. In this example, the pipeline 402 carries a fluid 412 there through (for example, through forced or natural circulation). The pipeline, as shown in this example implementation, is an above-ground pipeline that is positioned above the terranean surface 104 on one or more supports 114. In alternative examples, the pipeline 402 can be supported above the terranean surface 104 by hangers or other structure such that most or all of the pipeline 402 is not in direct or indirect contact with the terranean surface 104.

In this example, the fluid 412 can be a liquid, a gas, or a mixed-phase fluid. The fluid 412 can be, in this example implementation, a hydrocarbon fluid, such as Natural Gas Liquid (NGL) or Liquid Petroleum Gas (LPG). The fluid 412 can be circulated through the pipeline 402 at a variety of flow rates (depending on the application) and at a variety of temperatures (depending on the fluid composition). In some aspects, the fluid 412 is at a temperature range of 25-350° F. (−4-175° C.), 120-350° F. (50-175° C.), or other temperature range. The fluid 412, in this example, can be at a steady-state temperature, e.g., a substantially constant temperature that changes insignificantly over a significant length of the pipeline 402.

As shown in this example implementation, the pipeline 402 is comprised of a conduit 410 (for example, a metal conduit such as steel or other metal) that is enclosed or encases (all or mostly) by a layer of insulation 408. A cladding 406 (for example, a metal cladding such as galvanized steel or aluminum). In the example pipeline 402, corrosion of the conduit 410 can occur when moisture (such as water) infiltrates an annulus space between the conduit 410 and the insulation 408. Once moisture infiltrates this annular space, corrosion (for example, CUI) can occur. As the corrosion cannot be easily observed due to the insulation 408 that covers the conduit 410, CUI is challenging to detect. Sources of moisture that can induce corrosion include rain, water leaks, and condensation, cooling water tower drift, deluge systems and steam tracing leaks. While corrosion usually begins locally at a particular location of the conduit 410, it can progress at high rates especially if there are repetitive thermal heating and/or cooling cycles or contaminants in the water medium or surrounding air such as chloride or acid.

The pipeline system 400 also includes a bypass conduit 416 that includes an outlet 417 that is positioned within the layer of insulation 408, such that a portion of the bypass conduit 416 passes through the cladding 406 of the pipeline 402. The bypass conduit 416 carries a secondary fluid 418 through the bypass conduit 416 and into the insulation 408 of the pipeline 402 (for example, to circulate within the insulation 408); thus in this system 400, the secondary fluid 418 and the fluid 412 are not mixed or fluidly coupled. The secondary fluid 418, in this example implementation, can be the same or different composition as the fluid 412. In some aspects, the secondary fluid 418 can be an inert gas (or other non-sour and non-toxic gas). In other aspects, the secondary fluid 418 can be a hydrocarbon gas.

At least one fan 420 is positioned in the bypass conduit 416 to circulate the secondary fluid 418 into the insulation 408 from a source 422 of the secondary fluid 418. In this example implementation, the secondary fluid 418 is at a different temperature than the fluid 412. For example, the secondary fluid 418 can be 0.4° C. lower or greater than a temperature of the fluid 412. In some examples, the secondary fluid 418 can be more than 0.4° C. lower or greater than the temperature of the fluid 412. In other examples, the secondary fluid 418 can be less than 0.4° C. lower or greater than the temperature of the fluid 412. In any event, the secondary fluid 418 can be introduced into the fluid 412 at a temperature sufficient to cause a change in temperature to at least a portion of the fluid 412 circulating through the conduit 410.

The pipeline system 400 in this example implementation, also includes a heating device 430 positioned at or near an exterior surface of the pipeline 402. The heating device 430, such as a hot air gun that uses resistance heating, can be operated to provide a heated fluid 432 (such as a heated airflow) against the exterior surface of the pipeline 402 in order to adjust (for example, raise) a temperature of at least a portion of the pipeline 402, including, in some examples, the fluid 412. The heating device 430, alternatively, can be a microwave heating device that heats the exterior surface of the pipeline 402 through microwaves. Alternatively, the heating device 430 can be a cooling device that operates to adjust (for example, lower) a temperature of at least a portion of the pipeline 402, including, in some examples, the fluid 412.

As shown in this example implementation, a thermal image detector 424 is positioned near or close to the pipeline 402 (and can be moved along a length of the pipeline 402 to capture one or more thermal images 426 of an exterior surface of the pipeline 402 (for example, with the cladding 406 and the insulation 408 remaining intact over the conduit 410). The captured thermal images 426 can show, for example, thermal gradients between the components of the pipeline 402, including, for example, between the fluid 412 (with the temperature adjusted by the secondary fluid 418) and the conduit 410, between the fluid 412 (with the temperature adjusted by the secondary fluid 418) and any moisture (such as water) between an exterior surface of the conduit 410 and the insulation 408, between the secondary fluid 418 (within the insulation 408) and the conduit 410, between the secondary fluid 412 (within the insulation 408) and any moisture (such as water) between an exterior surface of the conduit 410 and the insulation 408, as well as between other components of the pipeline 402. In some examples, the thermal image detector 424 can be an infrared (IR) camera or other device operable to capture thermographic images of the pipeline 402.

A control system 428 (such as a microprocessor based control system) is communicably coupled (wired or wirelessly) to the thermal image detector 424. In an example operation, subsequent to or during circulation of the secondary fluid 418 into the insulation 408 and operation of the heating device 430, the thermal image detector 424 can capture thermal images of one or more portions of the pipeline 402 (as controlled by the control system 428 or otherwise). The captured thermal images 426 can be transmitted to or otherwise available to the control system 428 for analysis and a determination of whether there is moisture under the insulation 408 (and therefore CUI or potential CUI) at any of the one or more portions of the pipeline 402. For example, the control system 428 can generate one or more heat maps over a length of the pipeline 402 based on the captured thermal images 426. The heat maps can show thermal gradients consistent with moisture between the conduit 410 and the insulation 408, as such moisture, likely being water, has a higher heat capacity as compared to the conduit 410. Based on the detection of moisture by the one or more heat maps, the control system 428 can determine a potential for CUI at the particular locations of the moisture.

Figure 5:
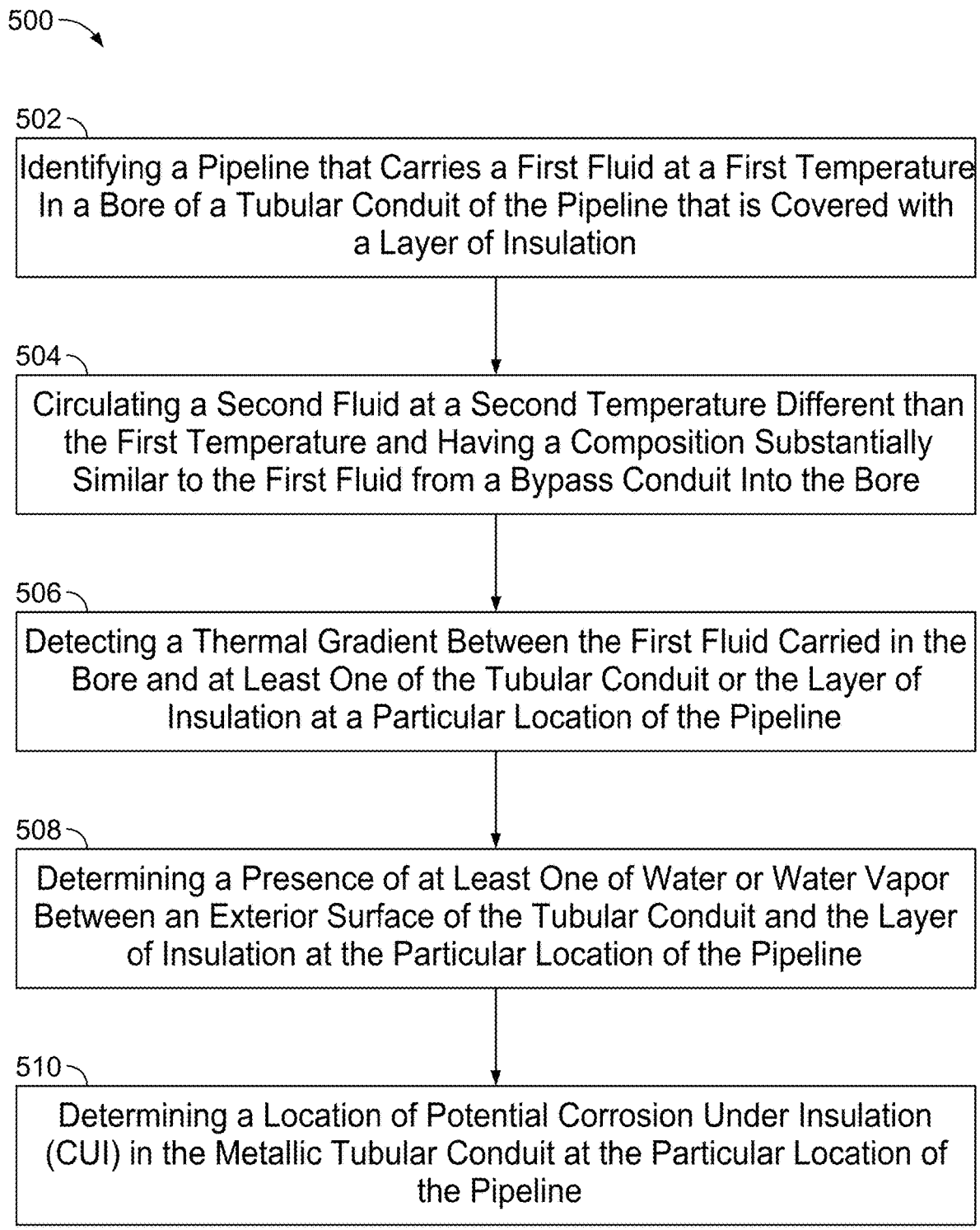
FIGS. 5-7 are flowcharts that illustrate example methods performed by a system for determining thermal conditions in a pipeline according to the present disclosure.

FIG. 5 is a flowchart that illustrates an example method 500 for determining thermal conditions in a pipeline. In some aspects, method 500 can be performed with or on the pipeline system 100 shown in FIG. 1. Method 500 can begin at step 502, which includes identifying a pipeline that carries a first fluid at a first temperature in a bore of a tubular conduit of the pipeline that is covered with a layer of insulation. For example, as shown in FIG. 1, the pipeline 102 includes a tubular conduit 110 (for example, a steel or other metallic conduit) that is surrounded by insulation 108. In the example of FIG. 1, the pipeline 102 also include a cladding 106 over the insulation (such as a metal cladding). Fluid 112 is circulated in the tubular conduit 110 and, in some examples, can be a hydrocarbon fluid such as NGL or LPG. The fluid 112 can be at a temperature range of, for example, 25-350° F. (−4-175° C.), 120-350° F. (50-175° C.), or other range.

Method 500 can continue at step 504, which includes circulating a second fluid at a second temperature different than the first temperature and having a composition substantially similar to the first fluid from a bypass conduit into the bore. For example, bypass conduit 116 of pipeline system 100 is connected to the pipeline 102 such that an outlet of the bypass conduit 116 is fluidly connected to the tubular conduit 110. Bypass or secondary fluid 118 can be circulated (for example, by a pump or fan) through the bypass conduit 116 into the tubular conduit 110 to mix with the fluid 112. The secondary fluid 118 can mix into the fluid 112 and, because of the temperature difference between the two fluids, change the temperature (for example, a steady-state temperature) of the fluid 112. In some aspects, the fluid 118 can be within 0.4° C. (or more) of the fluid 112. The secondary fluid 118 is the same or substantially the same composition as the fluid 112. In this example, a secondary fluid 119 that is substantially the same composition as the fluid 112 can have a different composition but, when mixed with the fluid 112, will not substantively change the composition of the fluid 112.

Method 500 can continue at step 506, which includes detecting a thermal gradient between the first fluid carried in the bore and at least one of the tubular conduit or the layer of insulation at a particular location of the pipeline. For example, as the secondary fluid 118 mixes in with the fluid 112 from the bypass conduit 116, the temperature of the fluid 112 can be changed (due to the different temperature of the secondary fluid 118). A thermal gradient can thus be generated between the fluid 112 and one or more components of the pipeline 102, such as between the fluid 112 and the conduit 110 or between the fluid 112 and the insulation 108. For instance, the conduit 110 and the insulation 108 may remain at or near the previous temperature of the fluid 112

(for example, the steady-state temperature of the fluid 112) prior to injecting the secondary fluid 118 into the conduit 110.

In some aspects, step 506, as well as step 504, can occur at particular time instants during a day (for example, during a 24 hour period) to maximize the detection of the thermal gradient. For instance, in some aspects, steps 504 and 506 can occur at one or both of a sunrise time or sunset time. For example, thermal anomalies in the pipeline 102 can be detectable more easily at sunrise or sunset; because of that the change in temperature profile (e.g., between 7 and 9 AM) can be higher at these time intervals, thus allowing bigger temperature differences between the fluid 112 and, for example, an exterior surface of the pipeline 102 (such as the surface of the cladding 106). This behavior eventually drives more heat transfer that can be easily detected by an IR camera in step 506. Further, in some aspects, sunrise and/or sunset can be preferred times of a day in order to perform steps 504 and 506. This is due to the heat capacity and thermal characteristics of the anomalies. For example, water (which is the main precursor of CUI) has a higher thermal heat capacity compared to its surroundings (such as material in the pipeline 102). Water can still maintain its temperature condition and is slow to change temperature as compared to the materials of the pipeline 102.

As another example, step 506, as well as step 504, can occur at certain operational time instants during a day (for example, during a 24 hour period) to maximize the detection of the thermal gradient and minimize interruption of the operation of the pipeline 102. For example, steps 504 and 506 (as well as other steps of method 500) can occur at an operation shutdown (e.g., ceasing of circulation of the fluid 112 in the pipeline 102) or operation start-up (e.g., beginning of circulation of the fluid 112 in the pipeline 102) of the pipeline 102.

Method 500 can continue at step 508, which includes determining a presence of at least one of water or water vapor between an exterior surface of the tubular conduit and the layer of insulation at the particular location of the pipeline. For example, based on the detected thermal gradient, a thermal image can be generated (for example, by an IR camera or other thermal image detector) that shows the thermal gradient between the fluid 112 and water or water vapor between the tubular conduit 110 and the insulation 108. The water or water vapor may, like the tubular conduit 110 and insulation 108, remain at or near the steady-state temperature of the fluid 112 for a period of time subsequent to the injection of the secondary fluid 118 into the tubular conduit 110. Thus, once the temperature of the fluid 112 is changed by the secondary fluid 118, a thermal gradient between the fluid 112 and the water or water vapor is created (and can be detected by a thermal image).

Method 500 can continue at step 510, which includes determining a location of potential corrosion under insulation (CUI) in the metallic tubular conduit at the particular location of the pipeline. For example, once the detected thermal gradient and subsequent detection of a presence of water or water vapor (from the thermal gradient) is determined, locations of the water or water vapor can be determined, which are potential or actual locations for CUI. Of course, method 500 can be repeated for many locations or portions of the pipeline 102.

Figure 6:
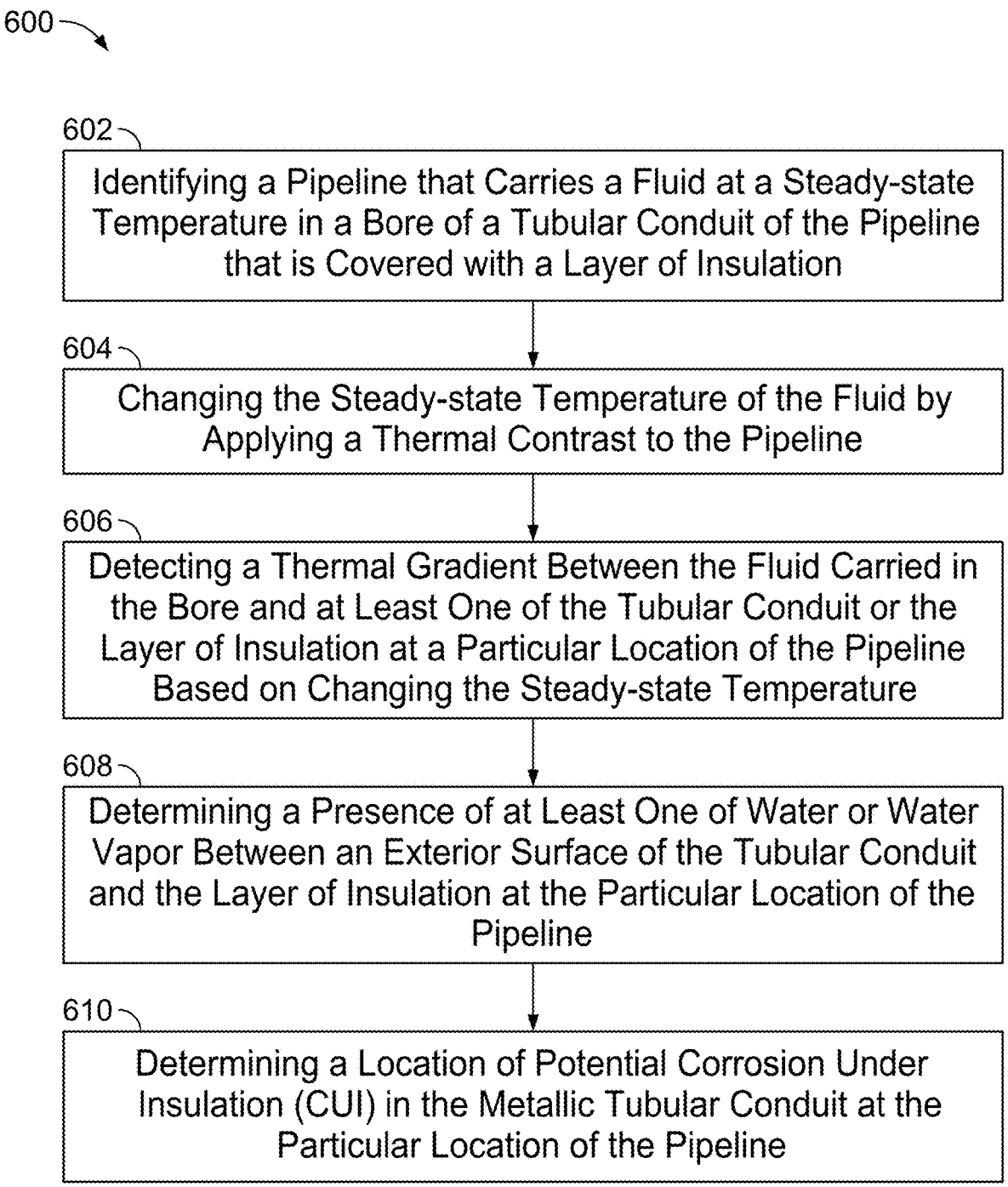

FIG. 6 is a flowchart that illustrates another example method 600 for determining thermal conditions in a pipeline. In some aspects, method 600 can be performed with or on any one of the pipeline systems 200, 300, or 400 shown in FIGS. 2-4, respectively (with FIG. 4 being representative for method 600). Method 600 can begin at step 602, which includes identifying a pipeline that carries a fluid at a steady-state temperature in a bore of a tubular conduit of the pipeline that is covered with a layer of insulation. For example, as shown in FIG. 4, the pipeline 402 includes a tubular conduit 410 (for example, a steel or other metallic conduit) that is surrounded by insulation 408. In the example of FIG. 4, the pipeline 402 also include a cladding 406 over the insulation (such as a metal cladding). Fluid 412 is circulated in the tubular conduit 410 and, in some examples, can be a hydrocarbon fluid such as NGL or LPG. The fluid 412 can be at a temperature range of, for example, 25-350° F. (−4-175° C.), 120-350° F. (50-175° C.), or other range. Fluid 412, however, is circulated, for example, within a temperature range at a steady-state temperature.

Method 600 can continue at step 604, which includes changing the steady-state temperature of the fluid by applying a thermal contrast to the pipeline. For example, in some aspects, changing the steady-state temperature of the fluid by applying a thermal contrast to the pipeline includes circulating (for example, with a fan or pump) a secondary fluid 418 through a bypass conduit 416 of pipeline system 400 is connected to the pipeline 402 such that an outlet of the bypass conduit 416 is fluidly connected to the insulation layer 408 to circulate the secondary fluid 418 into the insulation 408 (but does not mix with the fluid 412). The secondary fluid 418 is at a different temperature than the fluid 412, thereby providing the thermal contrast. In some aspects, the fluid 418 can be within 0.4° C. (or more) of the fluid 112. The secondary fluid 118, in example aspects, is a gas, such as an inert gas or even a sour, corrosive gas.

In other example aspects, changing the steady-state temperature of the fluid by applying a thermal contrast to the pipeline includes applying heat or a heated fluid (for example, airflow) to an exterior surface of the pipeline. For example, the heating device 430, such as a hot air gun that uses resistance heating, can be operated to provide heated fluid 432 (such as a heated airflow) against the exterior surface of the pipeline 402 in order to adjust (for example, raise) a temperature of the pipeline 402, including, for example, the fluid 412. Thus, the thermal contrast generated by the heating device 430 can also change the steady-state temperature of the fluid 412.

In other example aspects, changing the steady-state temperature of the fluid by applying a thermal contrast to the pipeline includes both of: (1) circulating the secondary fluid 418 through the bypass conduit 416 and into the insulation 408 to adjust the temperature of the fluid 412; and (2) operating the heating device 430 to provide heated fluid 432 against the exterior surface of the pipeline 402 in order to adjust the temperature of the fluid 412.

Method 600 can continue at step 606, which includes detecting a thermal gradient between the fluid carried in the bore and at least one of the tubular conduit or the layer of insulation at a particular location of the pipeline based on changing the steady-state temperature. For example, as the steady-state temperature of the fluid 412 is changed (due to the applied thermal contrast), one or more thermal gradients are generated. A thermal gradient can thus be generated between the fluid 412 and one or more components of the pipeline 402, such as between the fluid 412 and the conduit 410 or between the fluid 412 and the insulation 408. For instance, the conduit 410 and the insulation 408 may remain at or near the previous temperature of the fluid 412 (for example, the steady-state temperature of the fluid 412) prior to injecting the secondary fluid 418 into the insulation 408, prior to operating the heating device 430 to apply the heated fluid 432, or prior to both.

In some aspects, step 606, as well as step 604, can occur at particular time instants during a day (for example, during a 24 hour period) to maximize the detection of the thermal gradient. For instance, in some aspects, steps 604 and 606 can occur at one or both of a sunrise time or sunset time. For example, thermal anomalies in the pipeline 402 can be detectable more easily at sunrise or sunset; because of that the change in temperature profile (e.g., between 7 and 9 AM) can be higher at these time intervals, thus allowing bigger temperature differences between the fluid 412 and, for example, an exterior surface of the pipeline 402 (such as the surface of the cladding 406). This behavior eventually drives more heat transfer that can be easily detected by an IR camera in step 606. Further, in some aspects, sunrise and/or sunset can be preferred times of a day in order to perform steps 604 and 606. This is due to the heat capacity and thermal characteristics of the anomalies. For example, water (which is the main precursor of CUI) has a higher thermal heat capacity compared to its surroundings (such as material in the pipeline 402). Water can still maintain its temperature condition and is slow to change temperature as compared to the materials of the pipeline 402.

As another example, step 606, as well as step 604, can occur at certain operational time instants during a day (for example, during a 24 hour period) to maximize the detection of the thermal gradient and minimize interruption of the operation of the pipeline 402. For example, steps 604 and 606 (as well as other steps of method 600) can occur at an operation shutdown (e.g., ceasing of circulation of the fluid 412 in the pipeline 402) or operation start-up (e.g., beginning of circulation of the fluid 412 in the pipeline 402) of the pipeline 402.

Method 600 can continue at step 608, which includes determining a presence of at least one of water or water vapor between an exterior surface of the tubular conduit and the layer of insulation at the particular location of the pipeline. For example, based on the detected thermal gradient, a thermal image can be generated (for example, by an IR camera or other thermal image detector) that shows the thermal gradient between the fluid 412 and water or water vapor between the tubular conduit 410 and the insulation 408. The water or water vapor may, like the tubular conduit 410 and insulation 408, remain at or near the steady-state temperature of the fluid 412 for a period of time subsequent to the injection of the secondary fluid 418 into the tubular conduit 110. Thus, once the temperature of the fluid 412 is changed by the secondary fluid 418 or the heated fluid 432 (or both), a thermal gradient between the fluid 412 and the water or water vapor is created (and can be detected by a thermal image).

Method 600 can continue at step 610, which includes determining a location of potential corrosion under insulation (CUI) in the metallic tubular conduit at the particular location of the pipeline. For example, once the detected thermal gradient and subsequent detection of a presence of water or water vapor (from the thermal gradient) is determined, locations of the water or water vapor can be determined, which are potential or actual locations for CUI. Of course, method 600 can be repeated for many locations or portions of the pipeline 402.

Figure 7:
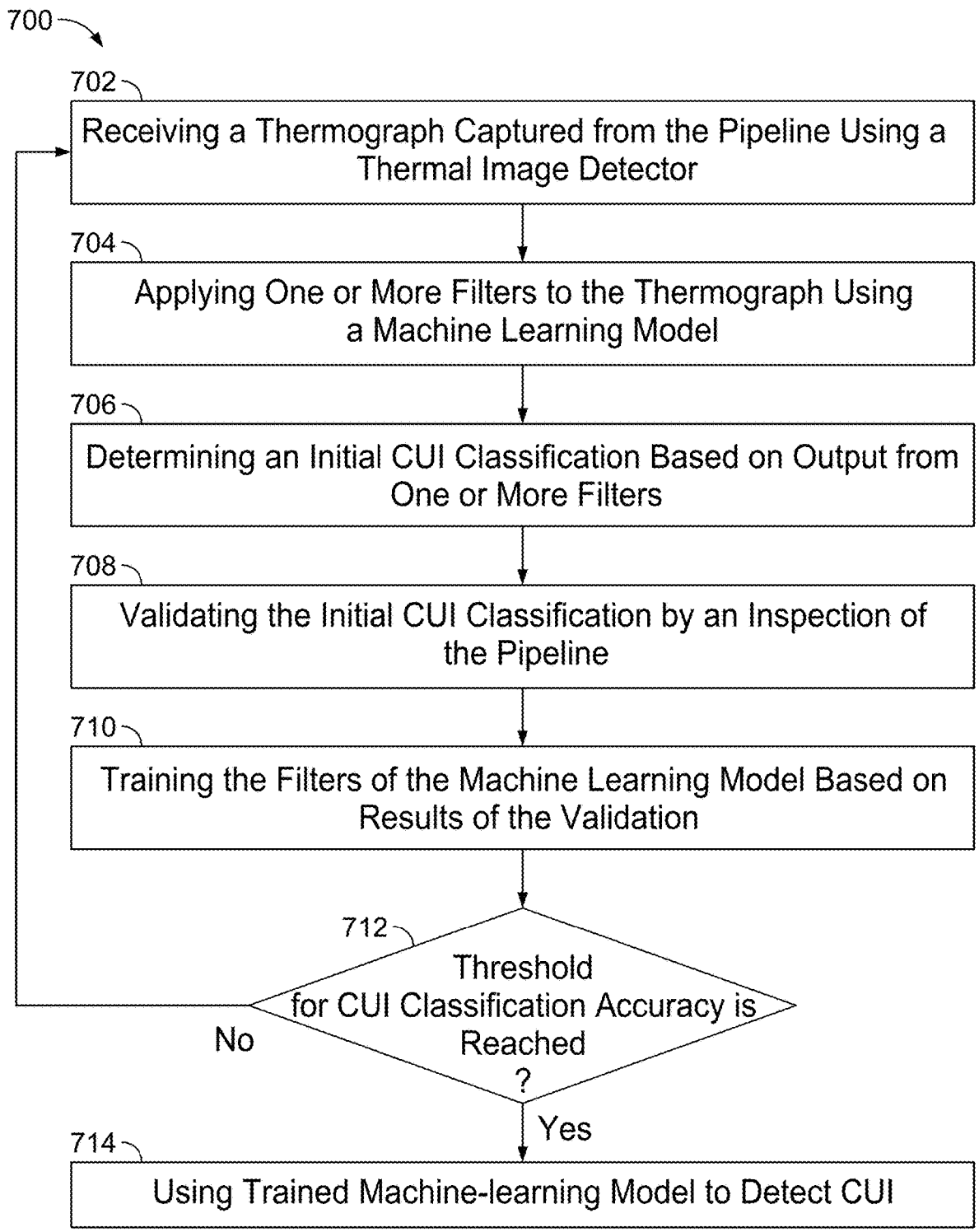

In some aspects, steps 510 or 610 (or both) can be performed with a machine-learning model on a control system (such as control systems 128 or 428). The machine-learning model executed by the control system can, for example, predict a type or classification of the potential CUI (from step 510 or 610) based on the thermal images captured in step 508 or 608, respectively. In some aspects, the machine-learning model can be trained on multiple (100s, 1000s, or otherwise) thermal images that have been correlated and verified to particular types of CUIs. FIG. 7, for example, illustrates an example method 700 for training a machine-learning model to use for predicting potential CUI as part of methods 500 and 600. All or some steps of method 700 can be performed with or by a control system of a pipeline system according to the present disclosure, such as control systems 128, 228, 328, or 428. Method 700 can begin at step 702, which includes receiving a thermograph captured from the pipeline using an thermal image detector. For example, as described with reference to steps 508 and 608, thermal images can be captured (such as by an IR camera) of the thermal gradients in the respective pipelines. The thermal images can be transmitted to or otherwise made available to the control system.

Method 700 can continue at step 704, which includes applying one or more filters to the thermograph using a machine-learning model. For example, a machine-learning model generated by the control system can include one or more classification filters for classifying CUI (or the lack thereof) based on the thermal image. The one or more filters can include, for instance, a machine-learning algorithm to detect color variation in the thermal images (for example, in digital format) that cannot be detected by the human eye.

Method 700 can continue at step 706, which includes determining an initial CUI classification based on output from one or more filters. For example, the machine-learning model can provide a prediction or classification of the CUI based on the thermograph to which the filters are applied.

Method 700 can continue at step 708, which includes validating the initial CUI classification by an inspection of the pipeline. For example, in some aspects, once the predicted CUI is generated by the machine-learning model of step 706, validation of the prediction can be provided by physical inspection of the pipeline at a location at which the thermograph was taken. In some aspects, the physical inspection includes removing the cladding and insulation to visually inspect a location of the tubular conduit at which the thermograph was taken.

Method 700 can continue at step 710, which includes training the filters of the machine-learning model based on results of the validation. For example, based on the validation, the one or more filters can be trained or adjusted to account for a confirmation (or disagreement) of the initial CUI classification from the validation. Training the one or more filters can include a machine-learning algorithm that compares the results with the ground truth. For example, if the results are not consistent or wrong, then the algorithm can be trained and adjusted accordingly to be able to detect future images more correctly.

Method 700 can continue at step 712, which includes a determination of whether a threshold for CUI classification accuracy has been reached. For example, if the machine-learning model has accurately classified a particular number (or percentage) of thermographs for the correct CUI classification, than a threshold has been satisfied and method 700 can continue at step 714. If however, the number (or percentage) of thermographs for the correct CUI classification has not been satisfied, method 700 can revert to step 702 to continue the machine-learning model training process.

Method 700 can continue from step 712 at step 714, which includes using the trained machine-learning model to detect CUI. For example, the trained machine-learning model can be implemented, for example as part of step 510 or 610 to determine the location of potential CUI in the metallic tubular conduit at the particular location of the pipeline at which a thermal image (or thermograph) was captured.

Figure 9:
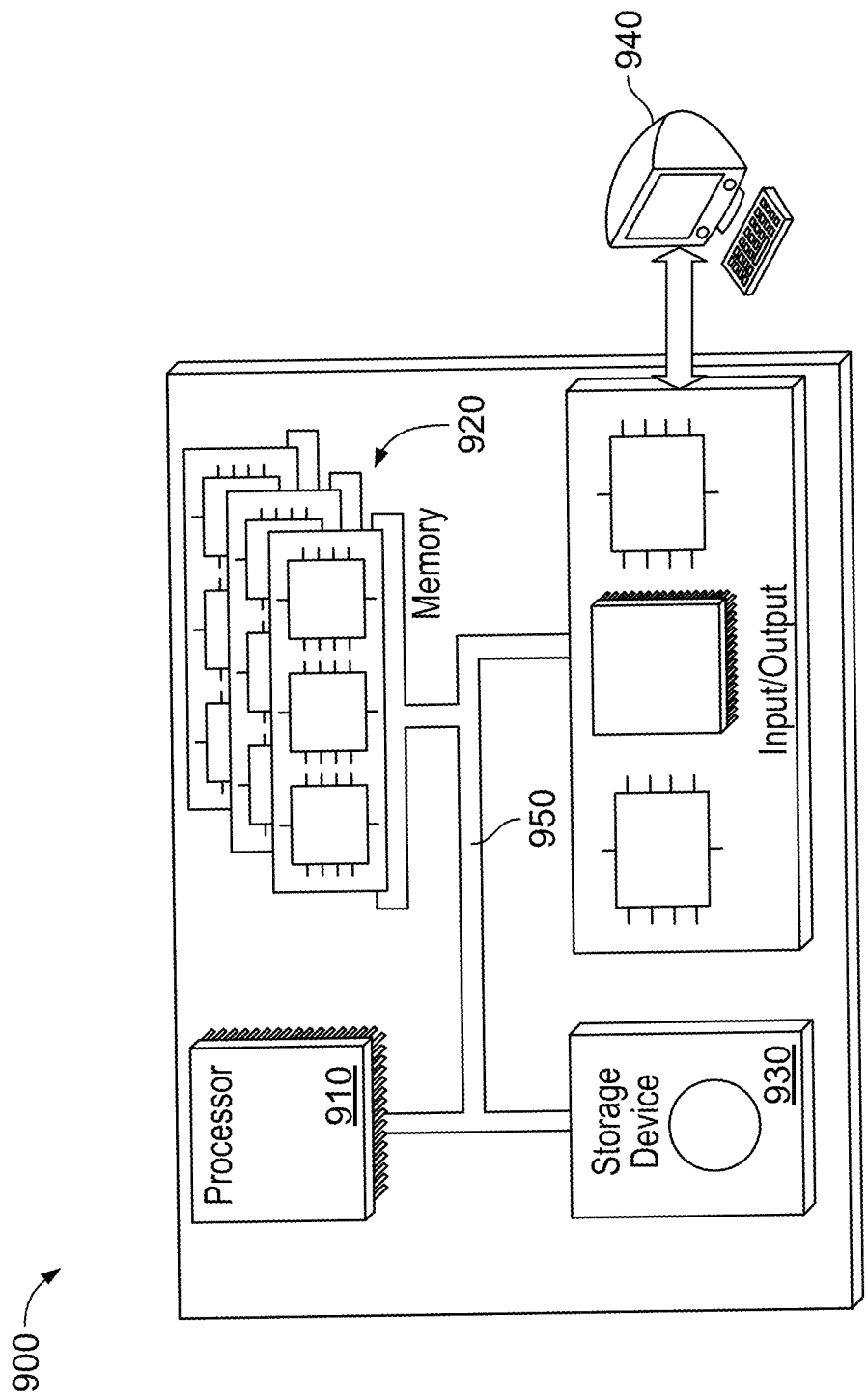
FIG. 9 is a schematic illustration of an example controller (or control system) for determining thermal conditions in a pipeline according to the present disclosure.

FIG. 9 is a schematic illustration of an example controller 900 (or control system) for determining thermal conditions in a pipeline. For example, all or parts of the controller 900 can be used for the operations described previously, for example as or as part of the control systems 128, 228, 328, or 428. The controller 900 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 900 includes a processor 910, a memory 920, a storage device 930, and an input/output device 940. Each of the components 910, 920, 930, and 940 are interconnected using a system bus 950. The processor 910 is capable of processing instructions for execution within the controller 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the controller 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the controller 900. In one implementation, the storage device 930 is a computer-readable medium. In various different implementations, the storage device 930 may be a floppy disk device, a hard disk device, an optical disk device, a tape device, flash memory, a solid state device (SSD), or a combination thereof.

The input/output device 940 provides input/output operations for the controller 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for determining a thermal condition of a pipeline, comprising:
   identifying a pipeline that carries a fluid at a steady-state temperature, the pipeline comprising:
      a tubular conduit that comprises a bore that carries the fluid, and
      a layer of insulation installed over an exterior surface of the tubular conduit;
   changing the steady-state temperature of the fluid by applying a thermal contrast to the pipeline;
   based on changing the steady-state temperature, detecting a thermal gradient between the fluid carried in the bore and at least one of the tubular conduit or the layer of insulation at a particular location of the pipeline; and
   based on the detected thermal gradient, determining a presence of at least one of water or water vapor between the exterior surface of the tubular conduit and the layer of insulation at the particular location of the pipeline.

2. The method of claim 1, wherein the fluid comprises a first fluid, and changing the steady-state temperature by applying the thermal contrast to the pipeline comprises:
   circulating a second fluid from a bypass conduit through an outlet of the bypass conduit that is positioned in the layer of insulation, the second fluid at a temperature different than the steady-state temperature; and
   changing the steady-state temperature through heat transfer between the first fluid and the second fluid.

3. The method of claim 2, wherein the first fluid comprises a hydrocarbon fluid and the second fluid comprises a non-hydrocarbon gas.

4. The method of claim 2, wherein circulating the second fluid from the bypass conduit through the outlet of the bypass conduit that is positioned in the layer of insulation comprises circulating the second fluid from the bypass conduit through the outlet of the bypass conduit that is positioned in the layer of insulation at a time instant of one of sunrise or sunset, and
   detecting the thermal gradient between the first fluid and at least one of the tubular conduit or the layer of insulation at the particular location of the pipeline comprises detecting the thermal gradient between the first fluid and at least one of the tubular conduit or the layer of insulation at the particular location of the pipeline subsequent to the circulating at the time instant.

5. The method of claim 2, wherein circulating the second fluid from the bypass conduit through the outlet of the bypass conduit that is positioned in the layer of insulation comprises circulating the second fluid from the bypass conduit through the outlet of the bypass conduit that is positioned in the layer of insulation at a time instant of a shutdown or a startup, and
   detecting the thermal gradient between the first fluid and at least one of the tubular conduit or the layer of insulation at the particular location of the pipeline comprises detecting the thermal gradient between the first fluid and at least one of the tubular conduit or the layer of insulation at the particular location of the pipeline subsequent to the circulating at the time instant.

6. The method of claim 2, wherein circulating the second fluid from the bypass conduit through an outlet of the bypass conduit that is positioned in the layer of insulation comprises forcibly circulating the second fluid with at least one pump or at least one fan positioned in fluid communication with the bypass conduit.

7. The method of claim 1, wherein changing the steady-state temperature by applying the thermal contrast to the pipeline comprises:
   heating an exterior surface of the pipeline to a temperature higher than the steady-state temperature; and
   changing the steady-state temperature through heat transfer from the exterior surface of the pipeline to the fluid in the bore.

8. The method of claim 1, wherein the fluid comprises a first fluid, and changing the steady-state temperature by applying the thermal contrast to the pipeline comprises:
   circulating a second fluid from a bypass conduit that comprises an outlet positioned in the layer of insulation, the second fluid at a temperature different than the steady-state temperature;
   heating an exterior surface of the pipeline to a temperature higher than the steady-state temperature; and
   changing the steady-state temperature through heat transfer between the first fluid and the second fluid and heat transfer between the exterior surface of the pipeline and the first fluid.

9. The method of claim 1, wherein the pipeline further comprises a cladding installed over an exterior surface of the layer of insulation, the method further comprising:
   detecting the thermal gradient between the fluid carried in the bore and at least one of the tubular conduit, the layer of insulation, or the cladding at the particular location of the pipeline.

10. The method of claim 1, wherein detecting the thermal gradient comprises generating a graphical representation of the thermal gradient with an infrared (IR) camera.

11. The method of claim 1, wherein the tubular conduit comprises a metallic tubular conduit.

12. The method of claim 11, further comprising, based on the presence of at least one of water or water vapor between the exterior surface of the tubular conduit and the layer of insulation at the particular location of the pipeline, determining a location of potential corrosion under insulation (CUI) in the metallic tubular conduit at the particular location of the pipeline.

13. The method of claim 1, wherein the steady-state temperature is between:
−4° C. and 175° C.; or
120° C. and 350° C.

14. The method of claim 1, further comprising:
identifying, with a control system communicably coupled to a thermal image detector, at least one thermograph of the thermal gradient from the thermal image detector;
correlating, with a machine learning model executed by the control system, the at least one thermograph with a classification of a corrosion under insulation (CUI) at the particular location; and
generating an output of the classification of the CUI at the particular location for display on a graphical user interface (GUI).

15. The method of claim 14, wherein the machine-learning model comprises a trained machine-learning model based on a plurality of thermographs correlated with user identified classifications of CUI.

16. A system, comprising:
a pipeline that carries a first fluid at a steady-state temperature, the pipeline comprising a tubular conduit that comprises a bore that carries the first fluid, and a layer of insulation installed over an exterior surface of the tubular conduit;
a second fluid configured to circulate to one of the layer of insulation or an exterior surface of the pipeline at a temperature sufficient to change the steady-state temperature of the first fluid; and
a thermal image detector configured to detect a thermal gradient between the first fluid carried in the bore and at least one of the tubular conduit or the layer of insulation at a particular location of the pipeline to indicate a presence of at least one of water or water vapor between the exterior surface of the tubular conduit and the layer of insulation at the particular location of the pipeline.

17. The system of claim 16, further comprising a bypass conduit that comprises an outlet positioned in the layer of insulation and configured to carry the second fluid into the layer of insulation to change the steady-state temperature through heat transfer between the first fluid and the second fluid.

18. The system of claim 17, wherein the first fluid comprises a hydrocarbon fluid and the second fluid comprises a non-hydrocarbon gas.

19. The system of claim 17, further comprising at least one pump or at least one fan positioned in fluid communication with the bypass conduit and configured to forcibly circulate the second fluid into the bypass conduit, through the outlet, and into the layer of insulation.

20. The system of claim 16, further comprising a heating device configured to supply the second fluid to the exterior surface of the pipeline to change the steady-state temperature through heat transfer between the first fluid and the second fluid through the exterior surface of the pipeline.

21. The system of claim 16, further comprising:
at least one pump or at least one fan positioned in fluid communication with the bypass conduit and configured to forcibly circulate the second fluid into the bypass conduit, through the outlet, and into the layer of insulation; and
a heating device configured to supply the second fluid to the exterior surface of the pipeline to change the steady-state temperature through heat transfer between the first fluid and the second fluid through the exterior surface of the pipeline.

22. The system of claim 16, wherein the pipeline further comprises a cladding installed over an exterior surface of the layer of insulation, and the thermal image detector is configured to detect a thermal gradient between the first fluid carried in the bore and at least one of the tubular conduit, the layer of insulation, or the cladding at the particular location of the pipeline.

23. The system of claim 16, wherein the thermal image detector comprises an infrared (IR) camera configured to generate a graphical representation of the thermal gradient.

24. The system of claim 16, wherein the tubular conduit comprises a metallic tubular conduit.

25. The system of claim 24, wherein the presence of at least one of water or water vapor between the exterior surface of the tubular conduit and the layer of insulation at the particular location of the pipeline indicates a location of potential corrosion under insulation (CUI) in the metallic tubular conduit at the particular location of the pipeline.

26. The system of claim 16, wherein the steady-state temperature is between:
−4° C. and 175° C.; or
120° C. and 350° C.

27. The system of claim 16, further comprising a control system communicably coupled to the thermal image detector and configured to perform operations comprising:
identifying at least one thermograph of the thermal gradient from the thermal image detector;
correlating, with a machine learning model executed by the control system, the at least one thermograph with a classification of a corrosion under insulation (CUI) at the particular location; and
generating an output of the classification of the CUI at the particular location for display on a graphical user interface (GUI).

28. The system of claim 27, wherein the machine-learning model comprises a trained machine-learning model based on a plurality of thermographs correlated with user identified classifications of CUI.

* * * * *